(12) United States Patent
Moriyama et al.

(10) Patent No.: US 11,982,319 B2
(45) Date of Patent: *May 14, 2024

(54) TORQUE TRANSMISSION SHAFT

(71) Applicant: NSK Ltd., Tokyo (JP)

(72) Inventors: Seiichi Moriyama, Maebashi (JP); Keisuke Nakao, Maebashi (JP)

(73) Assignee: NSK Ltd., Tokyo (JP)

(*) Notice: Subject to any disclaimer, the term of this patent is extended or adjusted under 35 U.S.C. 154(b) by 452 days.

This patent is subject to a terminal disclaimer.

(21) Appl. No.: 17/296,017

(22) PCT Filed: Nov. 18, 2019

(86) PCT No.: PCT/JP2019/045052
§ 371 (c)(1),
(2) Date: May 21, 2021

(87) PCT Pub. No.: WO2020/105582
PCT Pub. Date: Feb. 8, 2020

(65) Prior Publication Data
US 2022/0010841 A1    Jan. 13, 2022

(30) Foreign Application Priority Data
Nov. 22, 2018   (JP) .................. 2018-219568

(51) Int. Cl.
*F16D 1/04*    (2006.01)
*F16C 3/02*    (2006.01)
(Continued)

(52) U.S. Cl.
CPC .............. *F16D 1/04* (2013.01); *F16C 3/02* (2013.01); *F16D 3/44* (2013.01); *B62D 1/20* (2013.01);
(Continued)

(58) Field of Classification Search
CPC ...... F16D 1/04; F16D 3/44; F16C 3/02; F16C 2326/24; B62D 1/20; Y10T 403/535; Y10T 403/5786; Y10T 403/7188
(Continued)

(56) References Cited

U.S. PATENT DOCUMENTS 3,923,409 A * 12/1975 Stoner .................. B62D 1/16
                                                        403/290
10,738,833 B2 * 8/2020 Cymbal ................ F16D 3/387
(Continued)

FOREIGN PATENT DOCUMENTS

GB           16053    *  7/1894 ............... 403/290
JP      1-158826 U     11/1989
(Continued)

OTHER PUBLICATIONS

International Search Report (PCT/ISA/210) issued in PCT Application No. PCT/JP2019/045052 dated Jan. 7, 2020 with English translation (four (4) pages).
(Continued)

*Primary Examiner* — Greg Binda
(74) *Attorney, Agent, or Firm* — Crowell & Moring LLP

(57) ABSTRACT

The torque transmission shaft has a shaft having a hollow tubular shape and a clamp. The shaft has a connecting portion integral with the shaft at one axial end portion, a slit extending in the axial direction in a portion on the other axial end side and opens on the other side in the axial direction, and a female serration on the inner circumferential surface of the other axial end portion. The clamp is separate from the shaft and has a non-continuous portion at one location in the circumferential direction, a pair of flange portions on both sides of the non-continuous portion, and a connecting portion connecting the pair of flange portions in the circumferential direction. The clamp is externally fitted and fixed to
(Continued)

the other axial end portion of the shaft and reduces the diameter of the other axial end side portion of the shaft.

15 Claims, 12 Drawing Sheets

(51) Int. Cl.
    *F16D 3/44*       (2006.01)
    *B62D 1/20*       (2006.01)

(52) U.S. Cl.
    CPC ....... *F16C 2326/24* (2013.01); *Y10T 403/535* (2015.01); *Y10T 403/5786* (2015.01); *Y10T 403/7188* (2015.01)

(58) Field of Classification Search
    USPC .................................. 464/182; 403/290, 313
    See application file for complete search history.

(56) References Cited

U.S. PATENT DOCUMENTS

| | | | |
|---|---|---|---|
| 11,035,414 B2* | 6/2021 | Moriyama | ................ F16D 1/04 |
| 2022/0120319 A1* | 4/2022 | Moriyama | ............ F16D 1/0864 |

FOREIGN PATENT DOCUMENTS

| | | |
|---|---|---|
| JP | 9-310724 A | 12/1997 |
| JP | 2008-155778 A | 7/2008 |
| JP | 2011-220398 A | 11/2011 |
| JP | 2017-25964 A | 2/2017 |
| JP | 2017-172613 A | 9/2017 |

OTHER PUBLICATIONS

Japanese-language Written Opinion (PCT/ISA/237) issued in PCT Application No. PCT/JP2019/045052 dated Jan. 7, 2020 (four (4) pages).

* cited by examiner

TORQUE TRANSMISSION SHAFT

TECHNICAL FIELD

The present invention relates to a torque transmission shaft incorporated into a steering apparatus for an automobile and the like.

BACKGROUND ART

FIG. 11 illustrates a conventional example of a steering apparatus for an automobile described in JP 2017-025964A. The steering apparatus comprises a steering wheel 1, a steering shaft 2, a steering column 3, a pair of universal joints 4a, 4b, an intermediate shaft 5, a steering gear unit 6, and a pair of tie rods 7.

The steering wheel 1 is attached to the rear end portion of the steering shaft 2 which is rotatably supported inside the steering column 3. The front-end portion of the steering shaft 2 is connected to the pinion shaft 8 of the steering gear unit 6 via a pair of universal joints 4a, 4b and the intermediate shaft 5. The rotation of the pinion shaft 8 is converted into linear motion of a rack (not illustrated), and the pair of tie rods 7 is pushed or pulled, so that a steering angle is applied to the steered wheels according to the amount of operation of the steering wheel 1.

The universal joints 4a, 4b connect the steering shaft 2 and the intermediate shaft 5, and the intermediate shaft 5 and the pinion shaft 8, which are rotation shafts that do not exist on the same straight line, so as to be able to transmit torque. As the universal joints 4a, 4b, an universal joint comprising a pair of yokes and a joint spider described in JP2011-220398A and the like is used.

CITATION LIST

Patent Literature

Patent Literature 1: JP2017-025964A
Patent Literature 2: JP2011-220398A

SUMMARY OF INVENTION

Technical Problem

In a steering apparatus mounted to a large automobile, the distance from the steering shaft to the steering gear unit is long. Therefore, instead of directly fixing a shaft such as a steering shaft and a pinion shaft to a yoke of a universal joint, it is conceivable to fix the shaft to the yoke via a torque transmission shaft called an extension shaft.

FIG. 12(A) to FIG. 12(C) illustrate a torque transmission shaft 9 that the inventors of the present invention considered earlier. The torque transmission shaft 9 is arranged between a yoke 10 and a shaft 11 such as a steering shaft and a pinion shaft to connect the yoke 10 and the shaft 11 so as to be able to transmit torque. The torque transmission shaft 9 comprises a male serration 12 provided on the outer circumferential surface of one end portion in the axial direction, a female serration 13 provided on the inner circumferential surface of the other end portion in the axial direction, and a clamp portion 14 integrally provided on the other end portion in the axial direction so as to reduce the diameter of the other end portion in the axial direction of the torque transmission shaft 9. The clamp portion 14 comprises a non-continuous portion 15 provided at one location in the circumferential direction of the other end portion in the axial direction of the torque transmission shaft, a pair of flange portions 16 provided on both sides of the non-continuous portion 15, and an installation hole 17 where a tightening member (not illustrated) can be inserted.

The one end portion in the axial direction of the torque transmission shaft 9 is inserted inside the base portion 18 of the yoke 10. The male serration 12 serration-engages with the female serration 19 provided on the inner circumferential surface of the base portion 18. The torque transmission shaft 9 and the base portion 18 are welded and fixed by a weld bead portion 20 over the entire circumference.

One end portion in the axial direction of the shaft 11 is inserted into the other end portion in the axial direction of the torque transmission shaft 9. The female serration 13 serration-engages with the male serration 21 provided on the outer circumferential surface of the shaft 11. By screwing the tip end portion of the tightening member into the installation hole 17 or a nut (not illustrated), the outer circumferential surface of the shaft 11 is strongly tightened by the inner circumferential surface of the torque transmission shaft 9.

The torque transmission shaft 9 is usually manufactured by cold forging. Compared to hot forging, the shape accuracy and dimensional accuracy of the torque transmission shaft 9 manufactured by cold forging is higher. However, in the torque transmission shaft 9, it is difficult to secure a high degree of coaxiality between the male serration 12 and the female serration 13 provided on both end portions in the axial direction of the torque transmission shaft 9 due to a reason that the clamp portion 14, which complicates the flow of the metal material, is integrally provided, and so on. Further, since the torque transmission shaft 9 and the yoke 10 are welded and fixed, the coaxiality between the torque transmission shaft 9 and the yoke 10 tends to be low due to thermal deformation or the like. Therefore, as illustrated in FIG. 12(C), the swing of the shaft connected to the torque transmission shaft 9, that is, the shaft 11a connected via the yoke 10 or the shaft 11 connected to the female serration 13, may increase. As a result, noise such as sliding noise in the direction of rotation and stick-slip vibration noise may occur in part of the steering apparatus to which the torque transmission shaft 9 is applied, due to the swing of the shaft connected to the torque transmission shaft 9.

Taking the situation described above into consideration, the objective of the present invention is to achieve a structure of a torque transmission shaft that is capable of suppressing the swing of a shaft connected to the torque transmission shaft.

Solution to Problem

The torque transmission shaft of the present invention includes a shaft and a clamp separate from the shaft.

The shaft has a hollow tubular shape, and has one end portion in the axial direction, a connecting portion provided on the one end portion in the axial direction and capable of transmitting torque to other members, the other end portion in the axial direction, a slit provided at a portion on the other end side in the axial direction, extending in the axial direction, and having a closed end on one side in the axil direction and an open end on the other side in the axial direction, and a female serration provided on the inner circumferential surface of the other end portion in the axial direction. The connecting portion is provided integrally with the shaft.

The clamp has a partially missing cylindrical shape, and has a non-continuous portion arranged at one location in the circumferential direction, a pair of flange portions arranged on both sides of the non-continuous portion and has an installation hole into which a tightening member can be inserted, and a connecting portion having a partially cylindrical shape and connects the pair of flange portions in the circumferential direction. The clamp is separate from the shaft and is externally fitted and fixed to the other end portion in the axial direction of the shaft, and the diameter of the other end side portion in the axial direction of the shaft can be reduced by reducing the width dimension of the slit.

The clamp may be configured so as to apply a tightening force to a portion on the one side in the axial direction of the other end portion in the axial direction of the shaft greater than a portion on the other side in the axial direction of the other end portion in the axial direction when the width dimension of the slit is reduced.

Specifically, the connecting portion comprises a notch recessed in the one side in the axial direction from the other end surface in the axial direction of the flange portion in the portion on the other side in the axial direction of the connecting portion.

The notch may be arranged on the other side in the axial direction from the center axis of the installation hole.

The notch may have a shape in which the width in the axial direction becomes larger toward away from the flange portion in the circumferential direction of the connecting portion.

Alternatively, the notch may have a shape in which the width in the axial direction is constant in the circumferential direction of the connecting portion.

The end portion of the notch in the circumferential direction of the connecting portion may be arranged on the side closer to the installation hole than the center axis of the shaft in the direction orthogonal to both the center axis of the installation hole and the center axis of the shaft.

The notch may have a symmetrical shape with respect to an imaginary flat plane including the center axis of the shaft and orthogonal to the center axis of the installation hole.

The connecting portion may be composed of a yoke portion of a universal joint. Alternatively, the connecting portion may be composed of a serration portion, a spline portion, or a key-engagement portion.

Advantageous Effect of Invention

In the torque transmission shaft of the present invention, the coaxiality between the connecting portion and the female serration provided at both end portions in the axial direction of the torque transmission shaft and the coaxiality of the torque transmission shaft and the connecting portion can be secured at a high level. Further, in the torque transmission shaft of the present invention, the shaft connected to the female serration side can be tightened by a clamp so that precession does not occur on the shaft. Therefore, in the torque transmission shaft of the present invention, it is possible to suppress the swing of the shaft connected to the torque transmission shaft.

DESCRIPTION OF EMBODIMENTS

First Example

Figure 1:
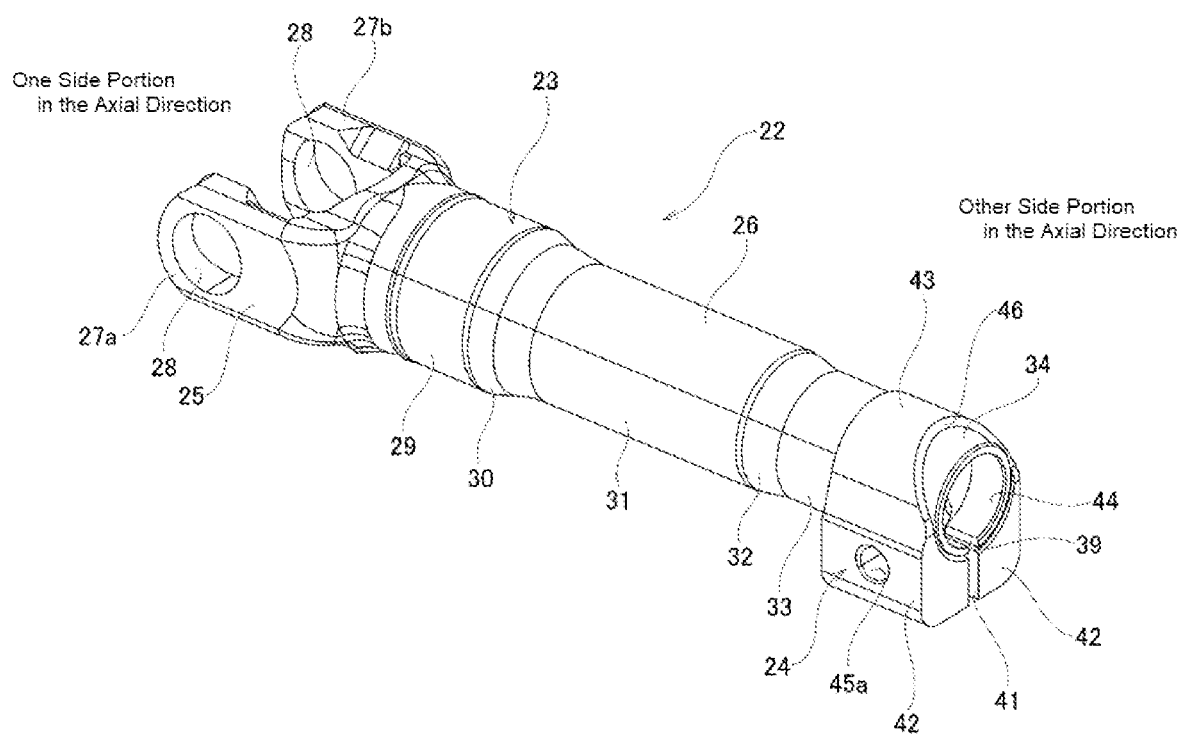
FIG. 1 is a perspective view of a first example of an embodiment of the present invention.
Figure 2:
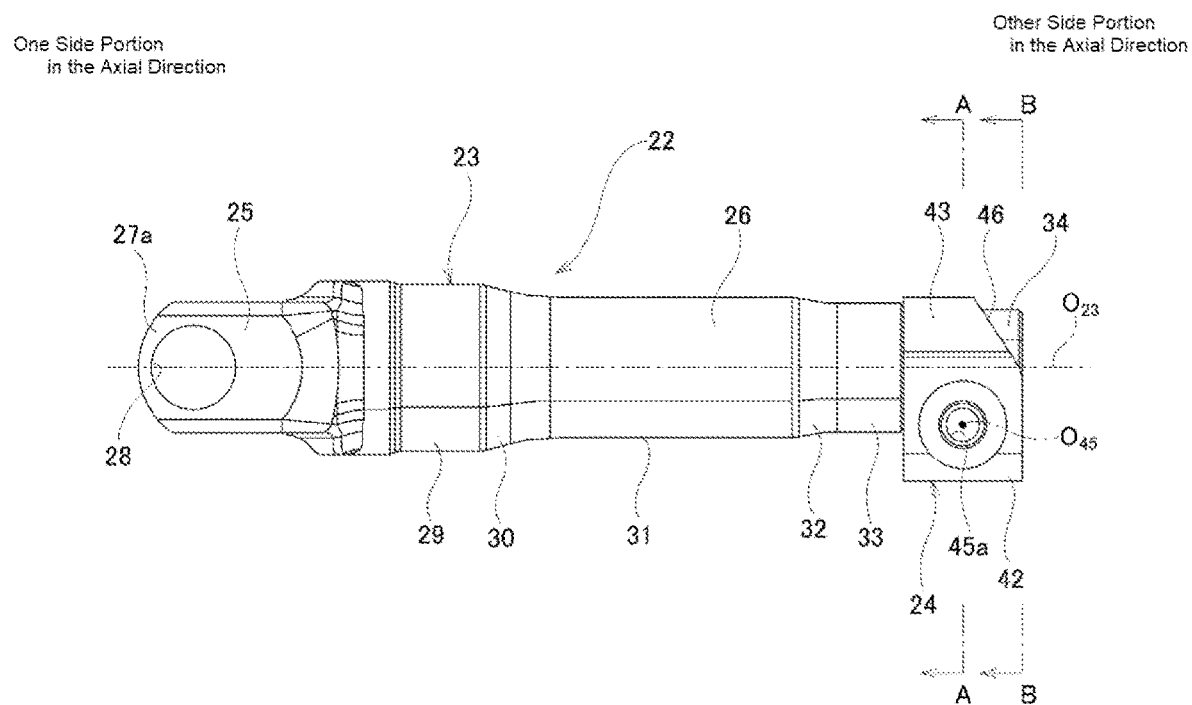
FIG. 2 is a side view of the torque transmission shaft of the first example.
Figure 3:
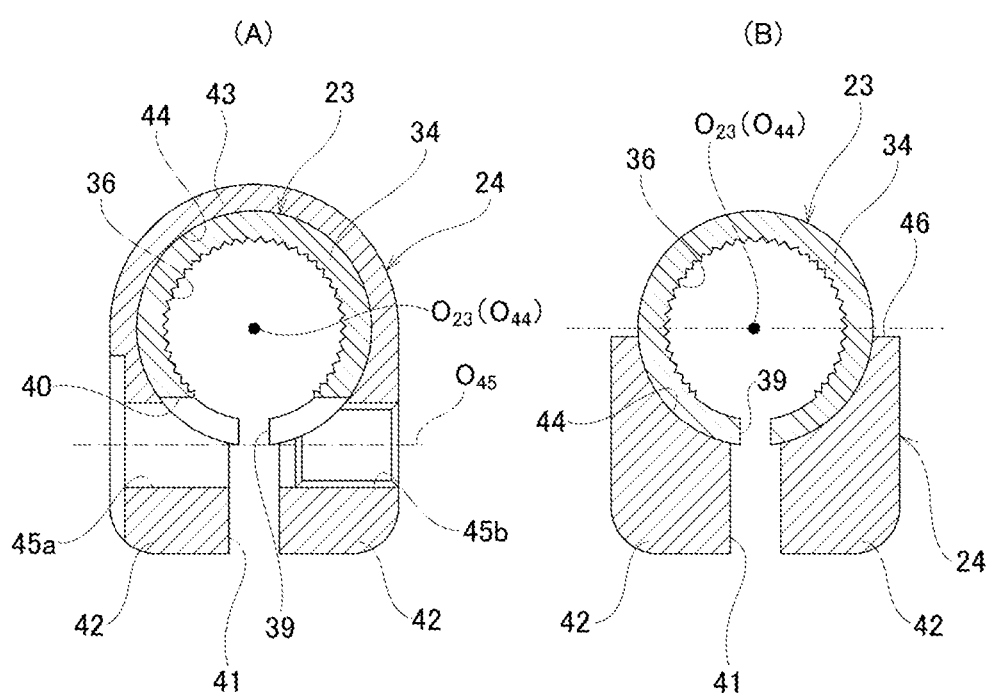
FIG. 3(A) is a cross-sectional view of section A-A in FIG. 2.
FIG. 3(B) is a cross-sectional view of section B-B in FIG. 2.
Figure 4:
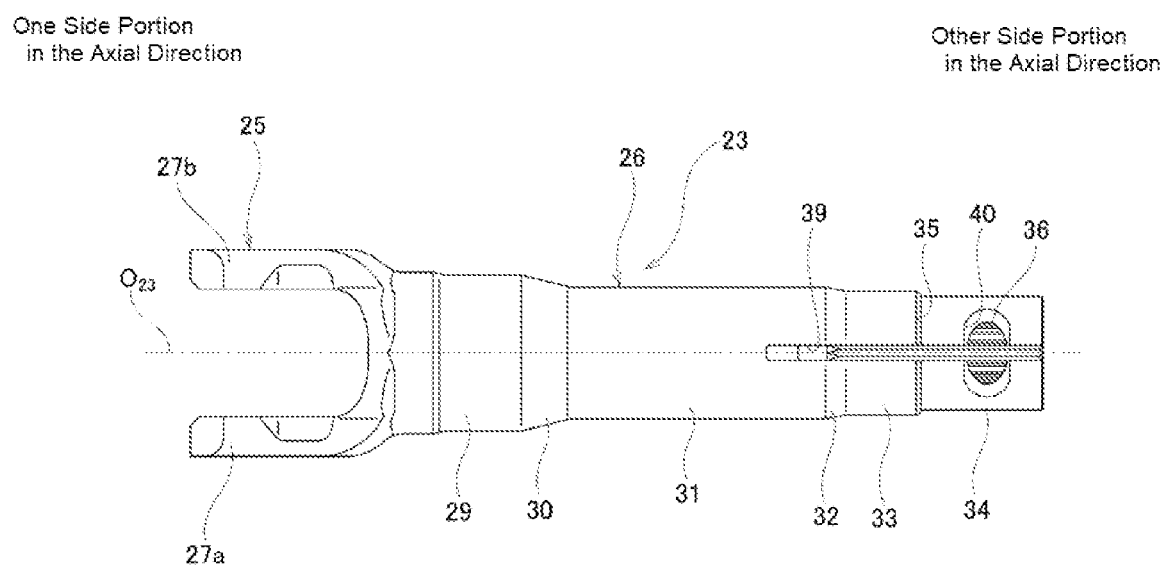
FIG. 4 is a plan view of the shaft of the torque transmission shaft of the first example.
Figure 5:
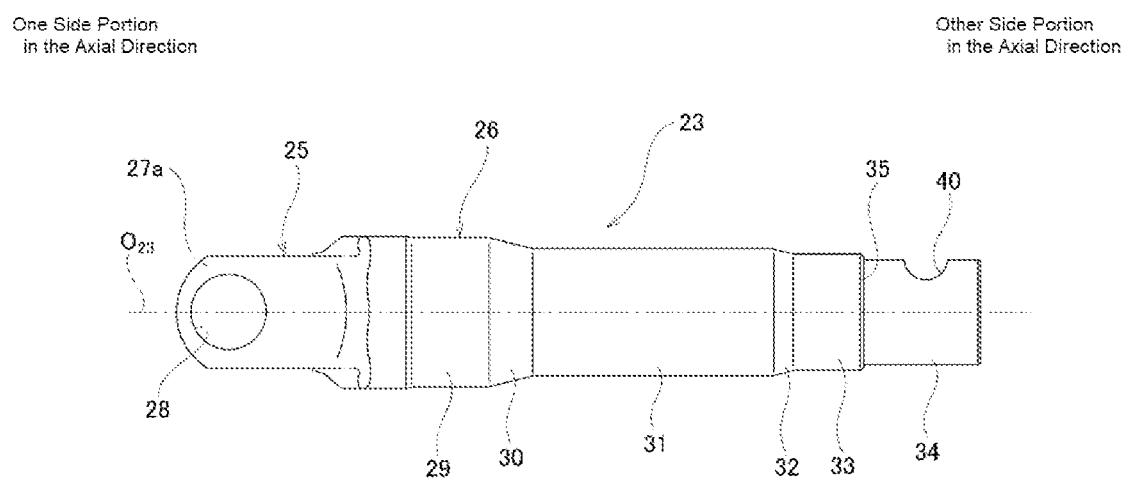
FIG. 5 is a side view of the torque transmission shaft of the first example.
Figure 6:
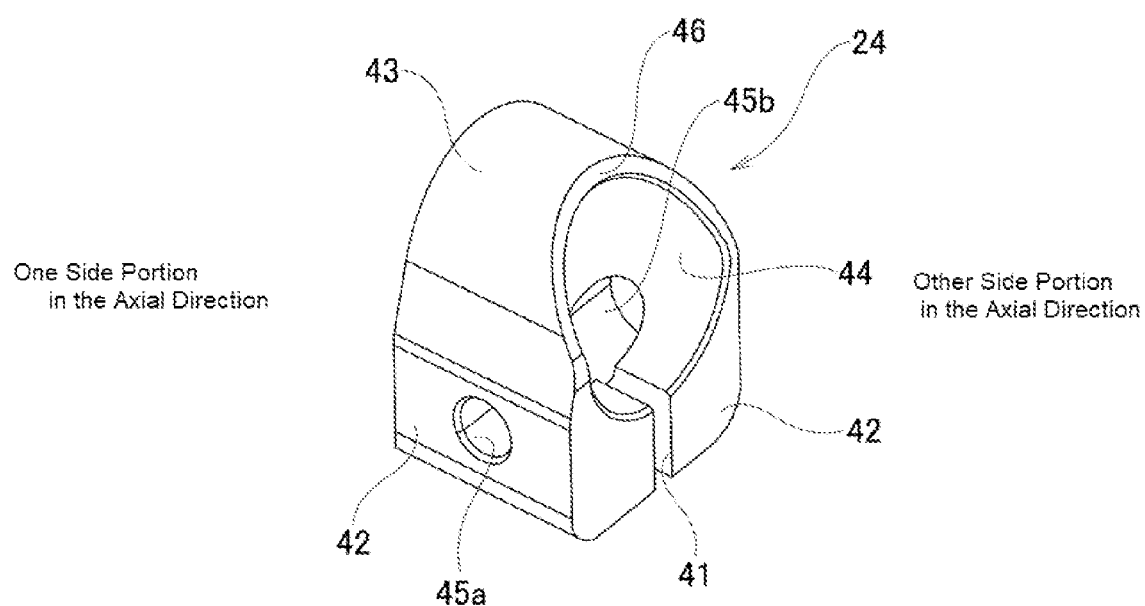
FIG. 6 is a perspective view of a clamp of the torque transmission shaft of the first example.
Figure 7:
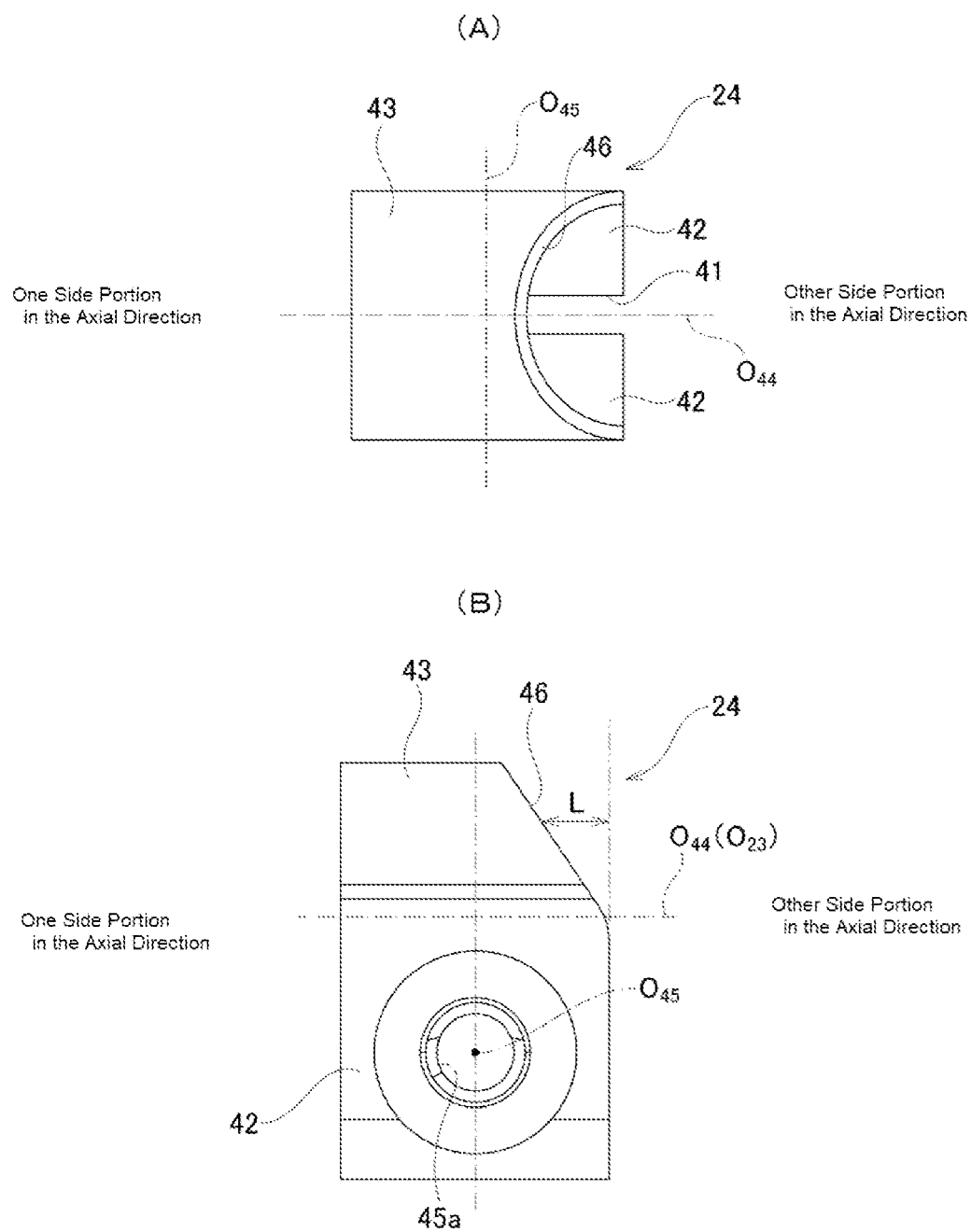
FIG. 7(A) is a plan view of the clamp of the torque transmission shaft of the first example.
FIG. 7(B) is a side view of the clamp of the torque transmission shaft of the first example.

A first example of an embodiment of the present invention will be described with reference to FIGS. 1 to 8. The torque transmission shaft 22 of the present example is, for example, incorporated into a steering apparatus of a large automobile, and is used to connect a steering shaft and an intermediate shaft or an intermediate shaft and a pinion shaft, which are rotation shafts that do not exist on the same straight line with each other, so as to be able to transmit torque.

The torque transmission shaft 22 includes a shaft 23 having a hollow tubular shape and a clamp 24 which is separate from the shaft 23 and has a partially missing cylindrical shape (substantially U-shaped). In the following description, the axial direction is the axial direction of the torque transmission shaft 22 unless specified otherwise. Further, one (one end) side in the axial direction is the left side in FIGS. 1, 2, 4, 5, 6, 7, and 8. The other (other end) side in the axial direction means the side on which the clamp 24 is arranged, and is the right side in FIGS. 1, 2, 4, 5, 6, 7, and 8.

The shaft 23 is integrally formed by forging (cold forging or hot forging) and cutting materials such as carbon steel cast steel (SC material). The shaft 23 includes one end portion in the axial direction and a connecting portion provided in the one end portion in the axial direction so as to be able to transmit torque to other members. In the present example, the connecting portion of the shaft 23 comprises a bifurcated yoke portion 25. From the intermediate portion in the axial direction to the other end portion in the axial direction of the shaft 23 is composed of a tubular potion 26.

The yoke portion 25 constitutes a joint spider type universal joint. The yoke portion 25 comprises arm portions 27a, 27b. The arm portions 27a, 27b extend from two positions on the opposite sides of one end edge in the axial direction of the tubular portion 26 to one side in the axial direction. The arm portions 27a, 27b have circular holes 28 coaxial with each other. A bearing cup and needles (not illustrated) are arranged and shaft portions constituting a joint spider are rotatably supported inside the respective circular holes 28.

The tubular portion 26 has a hollow tubular shape, and comprises a large-diameter tubular portion 29, a large-diameter side conical tubular portion 30, a medium-diameter tubular portion 31, a small-diameter side conical tubular portion 32, and a small-diameter tubular portion 33 in this order from one side in the axial direction.

The large-diameter tubular portion 29 has a stepped cylindrical shape, and is arranged in the one end portion in the axial direction of the tubular portion 26. The other end edge in the axial direction of the large-diameter tubular portion 29 is connected to one end edge in the axial direction of the large-diameter side conical tubular portion 30. The outer-diameter dimension and the inner-diameter dimension of the large-diameter tubular portion 29 are larger than the outer-diameter dimension and the inner-diameter dimension of other parts of the tubular portion 26 that exist on the other side in the axial direction of the large-diameter tubular portion 29. That is, the large-diameter tubular portion 29 has the largest diameter among the tubular portion 26.

The large-diameter side conical tubular portion 30 has a partial conical cylinder shape, and the outer-diameter dimension and the inner-diameter dimension become smaller toward the other side in the axial direction. The other end edge in the axial direction of the large-diameter side conical tubular portion 30 is connected to one end edge in the axial direction of the medium-diameter tubular portion 31.

The medium-diameter tubular portion 31 has a cylindrical shape, and is arranged in the intermediate portion in the axial direction of the tubular portion 26. The outer-diameter dimension and the inner-diameter dimension of the medium-diameter tubular portion 31 is constant over the axial direction. The other end edge in the axial direction of the medium-diameter tubular portion 31 is connected to one end edge in the axial direction of the small-diameter side conical tubular portion 32.

The small-diameter side conical tubular portion 32 has a partial conical cylinder shape, and the outer-diameter dimension and the inner-diameter dimension become smaller toward the other side in the axial direction. The other end edge in the axial direction of the small-diameter side conical tubular portion 32 is connected to one end edge in the axial direction of the small-diameter tubular portion 33.

The small-diameter tubular portion 33 has a stepped cylindrical shape, and is arranged in the other end portion in the axial direction of the tubular portion 26. The small-diameter tubular portion 33 comprises a fitting tubular portion 34 on its half of the other side in the axial direction, which has an outer-diameter dimension smaller than half of the one side in the axial direction of the small-diameter tubular portion 33 adjacent to the one side in the axial direction. The small-diameter tubular portion 33 has an approximately circular ring-shaped (C-shaped) stepped surface 35 facing the other side in the axial direction in the intermediate portion in the axial direction of its outer circumferential surface. In this example, the fitting tubular portion 34 and the stepped surface 35 are formed by cutting the half of the other side in the axial direction of the small-diameter tubular portion 33. The fitting tubular portion 34 has a cylindrical outer circumferential surface, and has a thickness smaller than the half of the one side in the axial direction of the small-diameter tubular portion 33. The dimension in the axial direction of the fitting tubular portion 34 is approximately the same as the dimension in the axial direction of the clamp 24. The stepped surface 35 is used for positioning the clamp 24 with respect to the shaft 23 in the axial direction by abutting the one end surface in the axial direction of the clamp 24 when the clamp 24 is fitted onto the fitting tubular portion 34.

Figure 8:
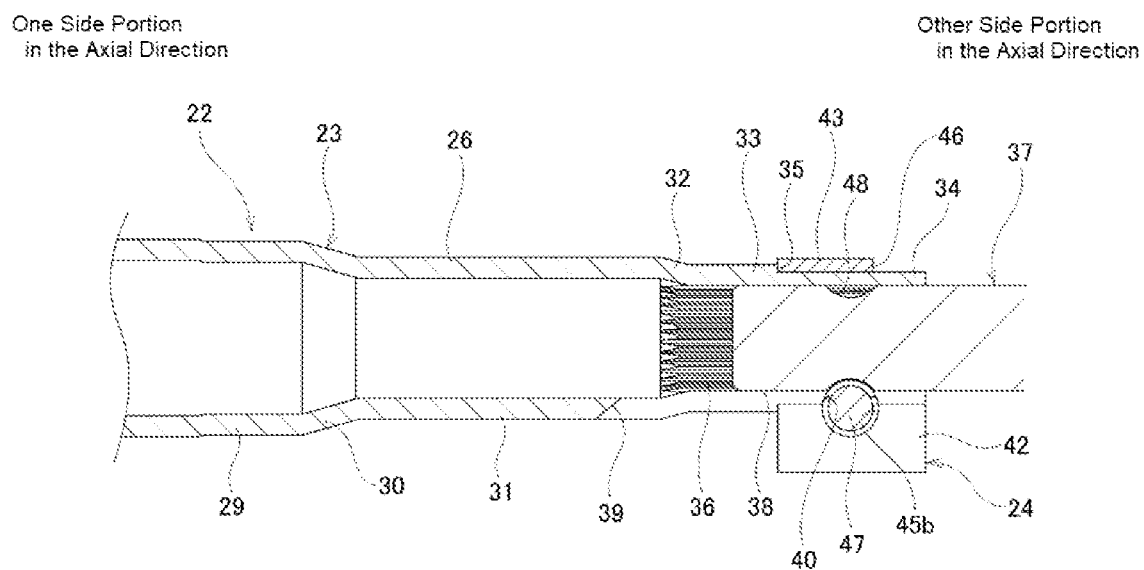
FIG. 8 is a cross-sectional view illustrating a connecting portion between the torque transmission shaft of the first example and a shaft connected to the torque transmission shaft.

In this example, of the inner circumferential surface of the tubular portion 26, a female serration 36 is provided over the entire length only on the inner circumferential surface of the small-diameter tubular portion 33 and the small-diameter side conical tubular portion 32, which correspond to the other end portion in the axial direction. In FIG. 1, the illustration of the female serration is omitted. As illustrated in FIG. 8, an end portion of a shaft 37 such as a steering shaft or a pinion shaft is inserted inside the small-diameter tubular portion 33. The female serration 36 serration-engages with the male serration 38 formed on the outer circumferential surface of the shaft 37.

A slit 39 extending in the axial direction is provided in a range from the medium-diameter tubular portion 31 to the small-diameter tubular portion 33, which corresponds to a portion on the other end side in the axial direction (from the intermediate portion in the axial direction to the other end portion in the axial direction) of the shaft 23. The slit 39 communicates the inner circumferential surface and the outer circumferential surface of the shaft 23, and is arranged at a position where the phase in the circumferential direction (position in the circumferential direction) with respect to a pair of the arm positions 27a, 27b of the yoke portion 25 is deviated by 90 degrees. One side of the slit 39 in the axial direction is composed of a closed end, which is located at the other end portion in the axial direction of the medium-diameter tubular portion 31 existing on the one side in the axial direction with respect to the small-diameter tubular portion 33. The other side of the slit 39 in the axial direction is composed of an open end, which is open at the other end edge in the axial direction of the fitting tubular portion 34 of the shat 23. In this example, the width dimension of the slit 39 is constant over the entire length. The slit 39 is formed by cutting using a rotary cutting tool such as a cutter. The one end portion in the axial direction (back end portion) of the slit 39 has a partial arcuate cross-sectional shape. Since the one end portion in the axial direction of the slit 39 is a closed end and the other end portion in the axial direction of the slit 39 is an open end, the rigidity of the fitting tubular portion 34 to which the clamp 24 is externally fitted is higher in a portion on the one side in the axial direction closer to the closed end of the slit 39 than a portion on the other side in the axial direction closer to the open end of the slit 39.

The shaft 23 is provided with an engaging concave groove 40 extending in a direction orthogonal to the center axis $O_{23}$ of the shaft 23 at a portion where the phase coincides with the slit 39 in the circumferential direction on the outer circumferential surface of the intermediate portion in the axial direction of the fitting tubular portion 34. The engaging concave groove 40 is formed so as to intersect the slit 39. The intersection of the engaging concave groove 40 and the slit 39 comprises a wide portion of the slit 39 having a width dimension larger than the portion adjacent to both sides in the axial direction of the intersection. The engaging concave groove 40 has a partially cylindrical surface shape, and the radius of curvature of the engaging concave groove 40 is substantially the same as the radius of curvature of the installation holes 45a, 45b of the clamp 24.

The clamp 24 is externally fitted and fixed to the fitting tubular portion 34 of the other end portion in the axial direction of the shaft 23, and is used for reducing the diameter of the portion on the other end side in the axial direction of the shaft 23, specifically, the range from the other end portion in the axial direction of the medium-diameter tubular portion 31 provided with the slit 39 to the fitting tubular portion 34. The clamp 24 is formed by subjecting a material such as S35C, which is a carbon steel for machine structure and has a hardness higher than the material of the shaft 23, to hot forging or cutting, alternatively, subjecting a material such as S10C or S15C, which is a carbon steel for machine structure, to cold forging that causes work hardening.

The clamp 24 has a partially missing cylindrical shape (substantially U-shaped) as a whole, and comprises a non-continuous portion 41, a pair of flange portions 42, a connecting portion 43, and an insertion hole 44.

The non-continuous portion 41 is arranged at one location in the circumferential direction of the clamp 24, which is located between the pair of flange portions 42. The pair of flange portions 42 is arranged on both sides of the non-continuous portion 41. Each flange portion of the pair of flange portions 42 has a generally rectangular plate shape. The connecting portion 43 is arranged on the opposite side of the non-continuous portion 41 with respect to the radial direction of the clamp 24, and connects the pair of flange portions 42 in the circumferential direction. The insertion hole 44 is formed by the inner circumferential surface of the connecting portion 43 and the side surfaces in the radial direction of the pair of flange portions 42. The fitting tubular portion 34 of the shaft 23 is inserted into the insertion hole 44. The insertion hole 44 has a partially cylindrical surface shape, and its inner-diameter dimension in the free state of the clamp 24 is the same as or slightly larger than the outer-diameter dimension of the fitting tubular portion 34 in the free state of the fitting tubular portion 34.

With the clamp 24 fixed to the fitting tubular portion 34 of the shaft 23, the circumferential positions of the non-continuous portion 41 and the slit 39 coincide with each other. In this example, the width dimension of the non-continuous portion 41 in the free state of the clamp 24 and the width dimension of the slit 39 in the free state of the shaft 23 (fitting tubular portion 34) are substantially the same as each other.

Installation holes 45a, 45b that penetrate in the thickness direction and are coaxial with each other are provided in portions of the pair of flange portions 42 that are aligned with each other. The installation holes 45a, 45b are formed at skewed positions with respect to the center axis $O_{44}$ of the insertion hole 44, and open into the insertion hole 44. One installation hole 45a of the installation holes 45a, 45b is composed of a through hole, and the other installation hole 45b is composed of a screw hole. In a state where the clamp 24 is fixed to the fitting tubular portion 34 of the shaft 23, the engaging concave groove 40 is located at a position facing to the openings of the installation holes 45a, 45b. That is, the axial positions of the installation holes 45a, 45b and the engaging concave groove 40 match. Further, both flange portions of the pair of flange portions 42 have the same plate thickness (thickness dimension) as each other.

The connecting portion 43 has a semi-cylindrical shape, and is provided with a notch 46 recessed from the other end surface in the axial direction of the flange portion 42 to the one side in the axial direction at a portion on the other side in the axial direction. The notch 46 extends in the circumferential direction of the connecting portion 43 and has a symmetrical shape with respect to an imaginary flat plane including the center axis $O_{23}$ of the shaft 23 and the center axis $O_{44}$ of the insertion hole 44 and orthogonal to the center axis $O_{45}$ of the installation holes 45a, 45b. As illustrated in FIG. 7(B), the shape of the notch 46 is substantially triangular when viewed from the axial direction of the installation holes 45a, 45b. Therefore, the width L in the axial direction corresponding to the notch depth of the notch 46 increases becomes large toward away from the flange portion 42 with respect to the circumferential direction of the connecting portion 43 (toward the upper side in FIG. 7(B)), and the width L becomes the largest at the portion located on the opposite side of the non-continuous portion 41 (the upper end portion in FIG. 7(B)) with respect to the radial direction. That is, the width L in the axial direction of the notch 46 becomes the smallest at both end portions in the circumferential direction of the connecting portion 43 and becomes the largest at the center portion in the circumferential direction of the connecting portion 43.

The notch 46 is arranged on the other side in the axial direction with respect to the center axis $O_{45}$ of the installation holes 45a, 45b. Specifically, one end edge in the axial direction of the notch 46 is located on the other side in the axial direction with respect to the center axis $O_{45}$ of the installation holes 45a, 45b, as well as on the one side in the axial direction with respect to the other end edge in the axial direction of the installation holes 45a, 45b. The end portion of the notch 46 with respect to the circumferential direction of the connecting portion 43 (the boundary position between the connecting portion 43 and the notch 46 in the circumferential direction) is, in the other end edge in the axial direction of the connecting portion 43, located on the side closer to the installation holes 45a, 45b from the center axis $O_{23}$ of the shaft 23 (the lower side in FIG. 2 and FIG. 7(B)) in the direction orthogonal to both the center axis $O_{45}$ of the installation holes 45a, 45b and the center axis $O_{23}$ of the shaft 23.

The connecting portion 43 had the same width in the axial direction as the pair of flange portions 42 over the entire circumference before forming the notch 46, however, by forming the notch 46, although the both end portions in the circumferential direction connected to the pair of flange portions 42 have the same width in the axial direction as the pair of flange portions 42, the width in the axial direction becomes smaller toward away from the pair of flange portions 42 in the circumferential direction, and in the circumferential direction center portion located on the opposite side of the non-continuous portion 41 in the radial direction, the width in the axial direction is about ⅗ of the width in the axial direction of the pair of flange portions 42. Therefore, the shape of the connecting portion 43 is a trapezoidal shape in which the shoulder portion (corner portion) of the other side in the axial direction is cut off diagonally when viewed from the axial direction of the installation holes 45a, 45b. The other end surface in the axial direction of the connecting portion 43 (the boundary position in the axial direction between the connecting portion 43 and the notch 46) is linearly inclined toward the one side in the axial direction as going away from the pair of flange portions 42 with respect to the circumferential direction of the connecting portion 43. That is, unlike the one end surface in the axial direction of the connecting portion 43, the other end surface in the axial direction of the connecting portion 43 does not exist on the imaginary flat plane orthogonal to the center axis $O_{44}$ of the insertion hole 44 and is inclined with respect to the center axis $O_{44}$ of the insertion hole 44. In the illustrated example, the inclination angle of the other end surface in the axial direction of the connecting portion 43 with respect to the center axis $O_{44}$ of the insertion hole 44 is 60 degrees. In this example, of the other side portion in the axial direction of the fitting tubular portion 34, the portion located on the opposite side of the slit 39 with respect to the radial direction is not covered by the connecting portion 43 of the clamp 24 and is exposed to the outside from the notch 46.

In this example, the shaft 23 and the clamp 24 are joined and fastened. The structure of joining and fixing the shaft 23 and the clamp 24 is not specifically limited, however, it is possible to employ a structure in which, for example, the shaft 23 and the clamp 24 are welded and fixed. Alternatively, the convex (or concave) shaft side engaging portion formed on the outer circumferential surface of the shaft 23 and the concave (or convex) clamp side engaging portion formed on the inner circumferential surface of the clamp 24 are concavo-convex engaged, and it is possible to employ a structure in which the shaft side engaging portion or the clamp side engaging portion is plastically deformed (caulked). In either case, in a state where the shaft 23 and the clamp 24 are fixed, the relative rotation of the shaft 23 and the clamp 24 and the relative displacement in the axial direction are prevented.

When joining and fixing the shaft 23 and the clamp 24, first, the other end portion in the axial direction of the shaft 23 is inserted inside the insertion hole 44 of the clamp 24 from the one side in the axial direction of the clamp 24. The circumferential positions of the non-continuous portion 41 of the clamp 24 and the slit 39 of the shaft 23 are matched, and the axial positions of the installation holes 45a, 45b and the engaging concave groove 40 are matched. In this example, the dimensions of the parts are regulated so that the axial positions of the installation holes 45a, 45b and the engaging concave groove 40 match by abutting the one end surface in the axial direction of the clamp 24 against the stepped surface 35.

Next, a tightening bolt 47 corresponding to a tightening member is arranged inside the installation holes 45a, 45b and the engaging concave groove 40. Specifically, as well as inserting a portion near the base end of the tightening bolt 47 inside one installation hole 45a, which is a through hole, the middle section of the tightening bolt 47 is arranged inside the engaging concave groove 40. In this state, the tip end portion of the tightening bolt 47 is slightly screwed into the other installation hole 45b, which is a screw hole, that is, to the extent that the diameter of the fitting tubular portion 34 is not reduced. Further, the engaging concave groove 40 and the tightening bolt 47 whose both end portions are supported by the clamp 24 are key-engaged. Due to this, as well as the clamp 24 is prevented from slipping out of the shaft 23 to the other side in the axial direction, the clamp 24 and the shaft 23 are prevented from rotating relative to each other. Finally, the shaft 23 and the clamp 24 are joined and fixed by a fixing means such as welding.

In this example, in a state where the torque transmission shaft 22 is used, the yoke portion 25 arranged at the one end portion in the axial direction of the torque transmission shaft 22 is combined with another yoke and joint spider (not illustrated). As a result, the torque transmission shaft 22 is connected to a shaft such as an intermediate shaft comprising the other yoke so as to be able to transmit torque. However, in a case of implementing the present invention, instead of the yoke portion of the universal joints, the connecting portion arranged at the one end portion in the axial direction of the torque transmission shaft can also be a serration portion, a spline portion, or a key-engaging portion that can connect other members such as a shaft to the connecting portion.

A shaft 37 such as a steering shaft or a pinion shaft is inserted inside the small-diameter tubular portion 33, and a female serration 36 of the inner circumferential surface of the small-diameter tubular portion 33 is serration-engaged to a male serration 38 of the outer circumferential surface of the shaft 37. As a result, the torque transmission shaft 22 and the shaft 37 are prevented from rotating relative to each other. The middle section of the tightening bolt 47 enters the inside of the circumferential concave groove 48 formed so as to cross the male serration 38 in the circumferential direction on the outer circumferential surface of the tip end portion of the shaft 37 via a wide portion which is an intersection between the engaging concave groove 40 and the slit 39, so that the circumferential concave groove 48 and the tightening bolt 47 key-engages. As a result, the relative movement of the shaft 37 and the torque transmission shaft 22 in the axial direction is prevented. As the amount of screwing of the tightening bolt 47 with respect to the other installation hole 45b increases, the width dimension of the non-continuous portion 41 becomes smaller and the diameter of the small-diameter tubular portion 33 is reduced, so that the outer circumferential surface of the shaft 37 is strongly tightened by the inner circumferential surface of the small-diameter tubular portion 33. Accordingly, the torque transmission shaft 22 and the shaft 37 are connected so as to be able to transmit torque.

In the torque transmission shaft 22 of the present example, the swing of the shaft connected to the torque transmission shaft 22 is suppressed. That is, in the torque transmission shaft 22 of the present example, the clamp is not provided integrally with the shaft, and a separate clamp 24 is fixed to the shaft 23. Therefore, the coaxiality between the yoke portion 25 and the female serration 36 arranged at both end portions in the axial direction of the shaft 23 is highly ensured. Further, in the torque transmission shaft 22 of the present example, instead of fixing a separate yoke portion to the shaft, the shaft 23 and the yoke portion 25 are provided integrally. Therefore, there is no effect of thermal deformation during welding, so that the coaxiality of the yoke portion 25 with respect to the shaft 23 (tubular portion 26) is highly ensured. Therefore, the swing of the shaft connected to the yoke portion 25 and the shaft 37 connected to the female serration 36 is effectively suppressed. As a result, generation of noise such as sliding noise in the direction of rotation and stick slip vibration noise caused by the swing of the shaft is prevented in part of the steering apparatus. Further, since the shaft 23 of this example is hollow, the weight of the torque transmission shaft 22 as a whole can be reduced.

In the torque transmission shaft 22 of the present example, precession of the shaft 37 connected to the other end portion in the axial direction of the shaft 23 is suppressed, and occurrence of fretting wear in the serration-engagement portion between the female serration of the shaft 23 and the male serration 38 of the shaft 37 due to the precession of the shaft 37 is suppressed. That is, of the slit 39 provided in the shaft 23, since the one side in the axial direction is a closed end and the other side in the axial direction is an open end, the rigidity of the fitting tubular portion 34 to which the clamp 24 is externally fitted is higher in the portion on the one side in the axial direction closer to the closed end of the slit 39 than in the portion on the other side in the axial direction closer to the open end of the slit 39. Further, the thickness of a portion of the small-diameter tubular portion 33 that exists on the one side in the axial direction from the fitting tubular portion 34 is larger than the thickness of the fitting tubular portion 34, therefore, from this aspect as well, the fitting tubular portion 34 has a higher rigidity in the portion on the one side in the axial direction than in the portion on the other side in the axial direction. Therefore, unlike this example, when the diameter of the fitting tubular portion 34 is reduced by using a clamp that does not have a notch in the connecting portion, the fitting tubular portion 34 tends to be deformed larger in the portion on the other side in the axial direction than in the portion on the one side in the axial direction. Accordingly, the surface pressure between the inner circumferential surface of the fitting tubular portion 34 and the outer circumferential surface of the shaft 37 is higher in the portion on the other side in the axial direction (the portion on the base end side of the shat 37) than in the portion on the one side in the axial direction (the portion on the tip end side of the shaft 37). That is, the shaft 37 is strongly tightened in the portion on the other side in the axial direction of the fitting tubular portion 34, and is relatively loosely tightened in the portion located on the one side in the axial direction thereof. Therefore, the shaft 37 is likely to precess around the portion strongly tightened by the portion on the other side in the axial direction of the fitting tubular portion 34. When the precession of the shaft 37 occurs, fretting wear is generated in the serration-engagement portion between the female serration 36 and the male serration 38, and the amount of wear tends to be excessive.

In this example, a notch 46 is provided in the portion on the other side in the axial direction of the connecting portion 43, and the portion on the other side in the axial direction of the fitting tubular portion 34 having a low rigidity is not covered by the connecting portion 43. Therefore, when the diameter of the fitting tubular portion 34 is reduced by the clamp 24, the portion on the one side in the axial direction of the fitting tubular portion 34 with high rigidity is given a greater tightening force than the portion on the other side in the axial direction with low rigidity. The amount of deformation that occurs in the fitting tubular portion 34 is made closer to each other between in the portion on the one side in the axial direction and in the portion on the other side in the axial direction. The surface pressure between the inner circumferential surface of the fitting tubular portion 34 and the outer circumferential surface of the shaft 37 can also be brought closer to each other by the portion on the one side in the axial direction and the portion on the other side in the axial direction. As a result, precession is suppressed on the shaft 37 connected to the other end portion in the axial direction of the shaft 23, and fretting wear is suppressed in the serration-engagement portion between the female serration 36 and the male serration 38. As a result, rattling between the shaft 23 and the shaft 37 is prevented, and noise caused by rattling is prevented.

The notch 46 is arranged on the other side in the axial direction from the center axis of the installation holes 45a, 45b, therefore, when the diameter of the fitting tubular portion 34 is reduced by the clamp 24, a large tightening force can be applied to the portion on the one side in the axial direction of the fitting tubular portion 34 with high rigidity by the connecting portion 43. Therefore, the surface pressure between the inner circumferential surface of the portion on the one side in the axial direction of the fitting tubular portion 34 and the outer circumferential surface of the shaft 37 can be effectively increased. Further, the end portion of the notch 46 with regard to the circumferential direction of the connecting portion 43 is, in the other end edge in the axial direction of the connecting portion 43, located closer to the installation holes 45a, 45b than the center axis $O_{23}$ of the shaft 23 in the direction orthogonal to both the center axis $O_{45}$ of the installation holes 45a, 45b and the $O_{23}$ of the shaft 23. Therefore, as illustrated in FIG. 3(B), in the other end edge in the axial direction of the shaft 23, the semicircular portion located on the opposite side of the slit 39 in the radial direction is exposed to the outside and is not covered by the connecting portion 43. As a result, when the diameter of the fitting tubular portion 34 is reduced by the clamp 24, the tightening force applied to the other end edge in the axial direction of the shaft 23 can be sufficiently reduced. Accordingly, precession is more effectively prevented on the shaft 37 connected to the other end portion in the axial direction of the shaft 23. Further, since the notch 46 is arranged only in the connecting portion 43 and not arranged in the flange portion 42, the fitting length in the axial direction of the clamp 24 with respect to the shaft 23 is sufficiently secured. Due to this, the posture of the clamp 24 with respect to the shaft 23 can be stabilized.

Second Example

Figure 9:
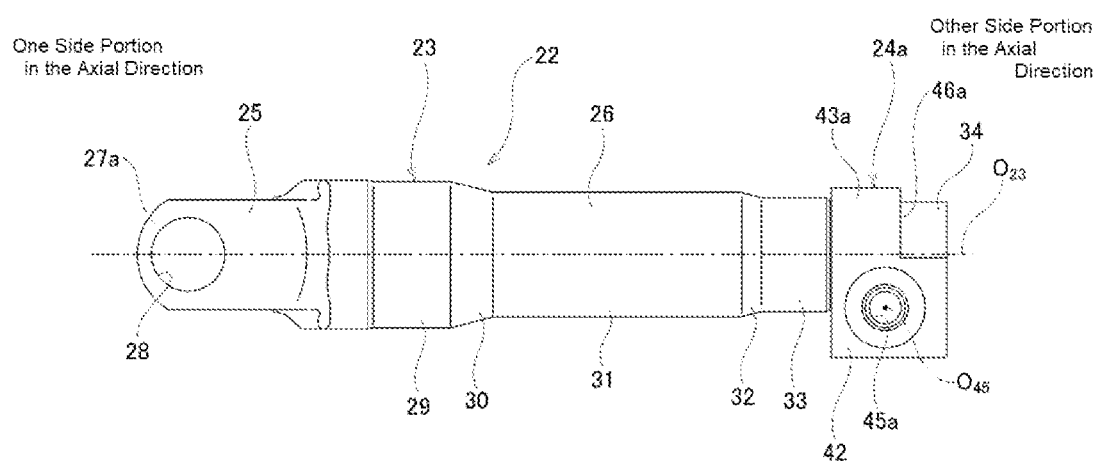
FIG. 9 is a side view of the torque transmission shaft of a second example of an embodiment of the present invention.
Figure 10:
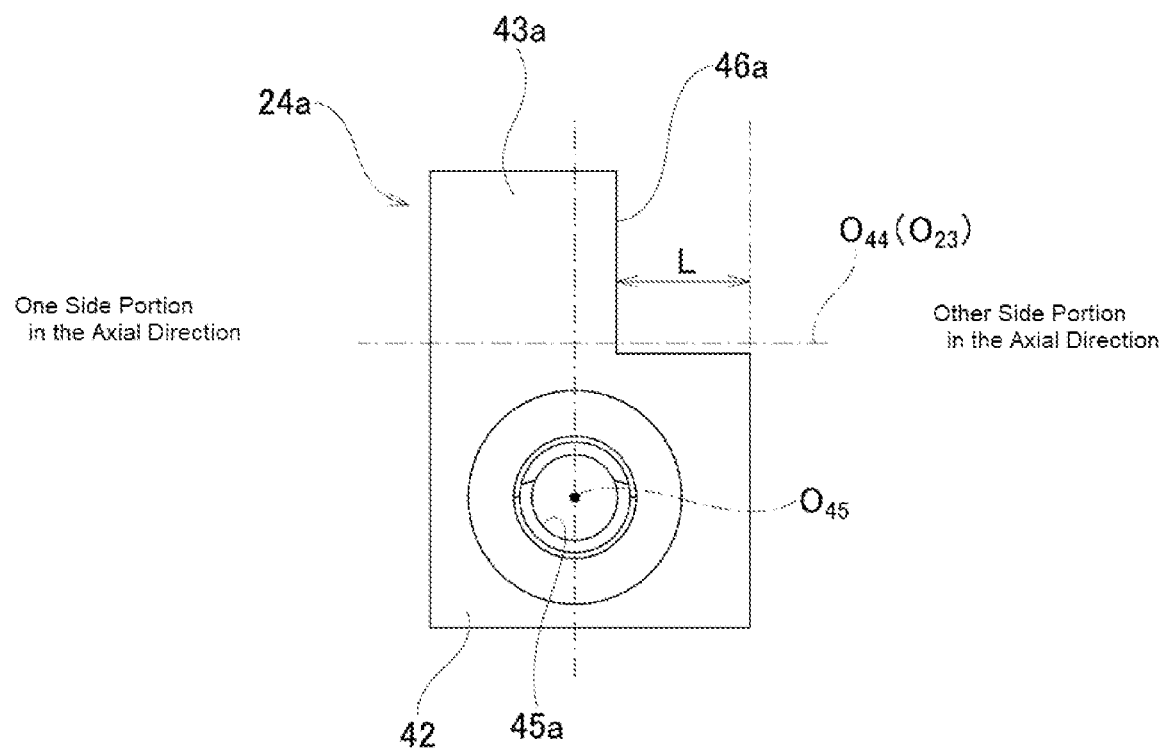
FIG. 10 is a side view of a clamp of the torque transmission shaft of the second example.
Figure 11:
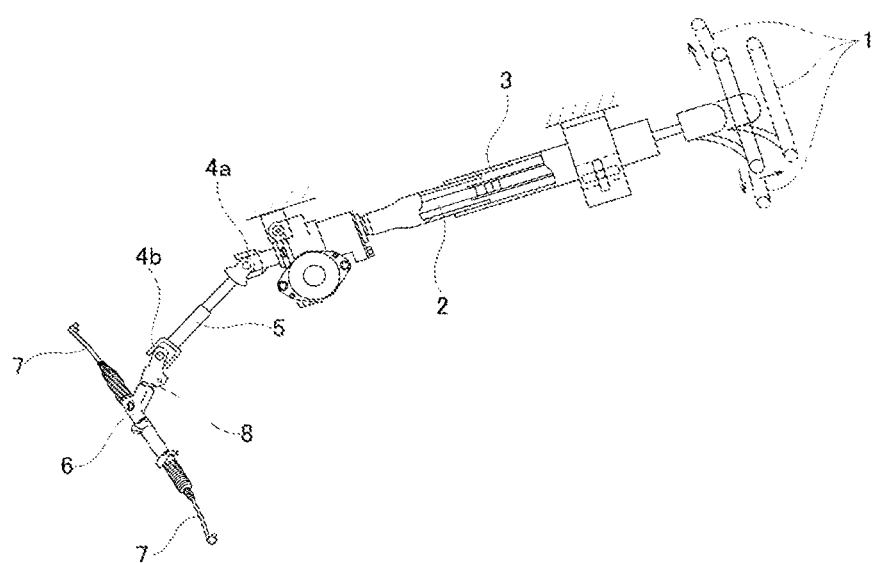
FIG. 11 is a partial cross-sectional view illustrating a conventional steering apparatus.
Figure 12:
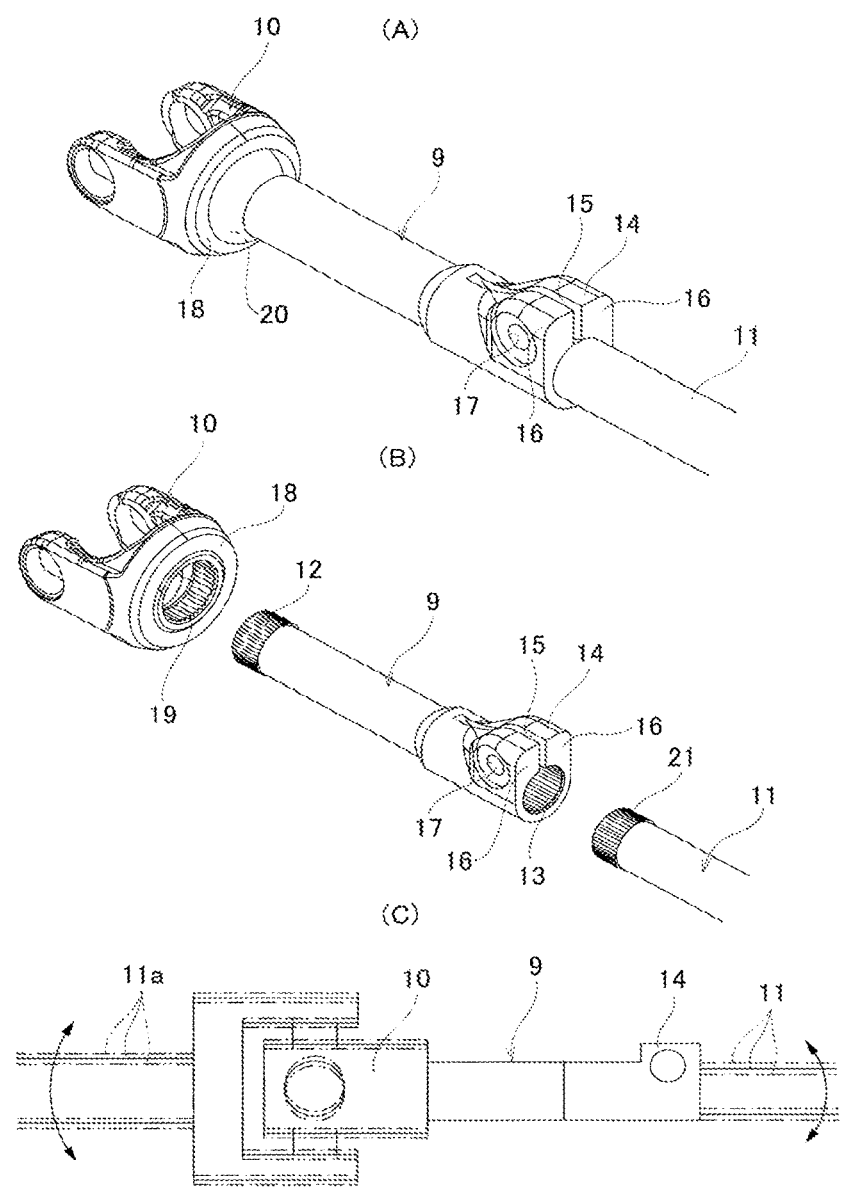
FIG. 12(A) is a perspective view illustrating a state in which s yoke and a rotation shaft are connected via the torque transmission shaft.
FIG. 12(B) is an exploded perspective view of FIG. 12(A)
FIG. 12(C) is a schematic view for explaining a state in which swing occurs on the shaft connected to the torque transmission shaft.

A second example of an embodiment of the present invention will be described with reference to FIGS. 9 to 10. In this example, the shape of the clamp 24a externally fitted to the fitting tubular portion 34 of the shaft 23 is different from the structure of the first example. Specifically, in this example, the shape of the notch 46a provided in the portion on the other side in the axial direction (half portion) of the connecting portion 43a of the clamp 24a is different from the shape of the notch 46 in the first example. The shape of the notch 46a is generally rectangular when viewed from the axial direction of the installation holes 45a, 45b. The width L in the axial direction of the notch 46a is constant in the circumferential direction of the connecting portion 43a. Therefore, when viewed from the axial direction of the installation holes 45a, 45b, the shape of the connecting portion 43a is a generally rectangular shape in which the half of the other side in the axial direction is cut off. The other end surface in the axial direction of the connecting portion 43a (the boundary position in the axial direction between the connecting portion 43a and the notch 46a) is parallel to the one end surface in the axial direction of the connecting portion 43a, and exists on an imaginary flat plane orthogonal to the center axis $O_{44}$ of the insertion hole 44.

The notch 46a is located on the other side in the axial direction (the right side in FIG. 9 and FIG. 10) from the center axis $O_{45}$ of the installation holes 45a, 45b. Specifically, the one end edge in the axial direction of the notch 46a exists at almost the same axial position as the other end edge in the axial direction of the installation holes 45a, 45b. Further, the end portions of the notch 46a in the circumferential direction of the connecting portion 43a (the boundary position in the circumferential direction between the connecting portion 43a and the notch 46a) are arranged parallel to the center axis $O_{23}$ of the shaft 23, and are located on the side closer to the installation holes 45a, 45b (the lower side in FIG. 9 and FIG. 10) from the center axis $O_{23}$ of the shaft 23 in the direction orthogonal to both the axis $O_{45}$ of the installation holes 45a, 45b and the center axis $O_{23}$ of the shaft 23 (the vertical direction in FIG. 9 and FIG. 10). In this example, the portion located on the opposite side of the slit 39 in the radial direction of the portion on the other side in the axial direction of the fitting tubular portion 34 is exposed to the outside from the notch 46a over a range wider than in the case of the first example.

In this example, since the formation range of the notch 46a is larger compared to the first example, the tightening force applied from the clamp 24a to the portion on the other side in the axial direction having low rigidity among the fitting tubular portion 34 can be smaller. Other configurations and operational effects are the same as in the first example.

In a case of implementing the present invention, the shape and the formation range of the notch formed in the connecting portion of the clamp are not limited to the structures shown in each example of an embodiment of the present invention. The end portions of the notch in the circumferential direction of the connecting portion can be arranged on the opposite side of the installation hole with the center axis of the shaft in between with respect to the direction orthogonal to both the center axis of the installation hole and the center axis of the shaft, or the end portions can be arranged on the center axis of the shaft. Further, all installation holes of the clamp can be configured by through holes and can be used in combination with a tightening bolt and a nut. Furthermore, the structure of each example of an embodiment of the present invention may be appropriately combined and implemented as long as no contradiction occurs.

REFERENCE SIGNS LIST

1 Steering wheel
2 Steering shaft
3 Steering column
4a, 4b Universal joint
5 Intermediate shaft
6 Steering gear unit
7 Tie rod
8 Pinion shaft
9 Torque transmission shaft
10 Yoke
11, 11a Shaft
12 Male serration
13 Female serration
14 Clamp portion
15 Non-continuous portion
16 Flange portion
17 Installation hole
18 Base portion
19 Female serration
20 Weld bead portion
21 Male serration
22 Torque transmission shaft
23 Shaft
24, 24a Clamp
25 Yoke portion
26 Tubular portion
27a, 27b Arm portion
28 Circular hole
29 Large-diameter tubular portion
30 Large-diameter side conical tubular portion
31 Medium-diameter tubular portion
32 Small-diameter side conical tubular portion
33 Small-diameter tubular portion
34 Fitting tubular portion
35 Stepped surface
36 Female serration
37 Shaft
38 Male serration
39 Slit
40 Engaging concave groove
41 Non-continuous portion
42 Flange portion
43, 43a Connecting portion
44 Insertion hole
45a, 45b Installation hole
46, 46a Notch
47 Tightening bolt
48 Circumferential concave groove

The invention claimed is:

1. A torque transmission shaft comprising:
a shaft having a hollow tubular shape and having one end portion in an axial direction, a connecting portion provided in the one end portion in the axial direction and capable of being connected to other member so as to be able to transmit torque, other end portion in the axial direction, a slit provided on a portion on other end side in the axial direction, extending in the axial direction, and having a closed end on one side in the axial direction and an open end on other side in the axial direction, a female serration provided on an inner circumferential surface of the other end portion in the axial direction; and
a clamp having a partially missing cylindrical shape and having a non-continuous portion arranged at one location in a circumferential direction, a pair of flange portions arranged on both sides of the non-continuous portion and having an installation hole into which a tightening member can be inserted, and a connecting portion having a partially cylindrical shape and connecting the pair of flange portions in the circumferential direction;
wherein the connecting portion is provided integrally with the shaft, and the clamp is separate from the shaft and is externally fixed on the other end portion in the axial direction of the shaft so as to be able to reduce the diameter of the portion on the other end side in the axial direction of the shaft by reducing a width dimension of the slit, and
wherein the clamp is configured to apply a tightening force to a portion on the one side in the axial direction of the other end portion in the axial direction of the shaft greater than a portion on the other side in the axial direction of the other end portion in the axial direction when the width dimension of the slit is reduced.

2. The torque transmission shaft according to claim 1, wherein the connecting portion comprises a notch recessed in the one side in the axial direction from an end surface on the other side in the axial direction of the flange portion in the portion on the other side in the axial direction of the connecting portion.

3. The torque transmission shaft according to claim 2, wherein the notch is arranged on the other side in the axial direction from a center axis of the installation hole.

4. The torque transmission shaft according to claim 2, wherein the notch has a shape in which a width in the axial direction becomes larger toward away from the flange portion in the circumferential direction of the connecting portion.

5. The torque transmission shaft according to claim 2, wherein the notch has a shape in which a width in the axial direction is constant in the circumferential direction of the connecting portion.

6. The torque transmission shaft according to claim 2, wherein an end portion of the notch in the circumferential direction of the connecting portion is arranged on a side closer to the installation hole than a center axis of the shaft in a direction orthogonal to both a center axis of the installation hole and the center axis of the shaft.

7. The torque transmission shaft according to claim 2, wherein the notch has a symmetrical shape with respect to an imaginary flat plane including a center axis of the shaft and orthogonal to a center axis of the installation hole.

8. The torque transmission shaft according to claim 1, wherein the connecting portion is configured by a yoke portion.

9. A torque transmission shaft comprising:
a shaft having a hollow tubular shape and having one end portion in an axial direction, a connecting portion provided in the one end portion in the axial direction and capable of being connected to other member so as to be able to transmit torque, other end portion in the axial direction, a slit provided on a portion on other end side in the axial direction, extending in the axial direction, and having a closed end on one side in the axial direction and an open end on other side in the axial direction, a female serration provided on an inner circumferential surface of the other end portion in the axial direction; and
a clamp having a partially missing cylindrical shape and having a non-continuous portion arranged at one location in a circumferential direction, a pair of flange portions arranged on both sides of the non-continuous portion and having an installation hole into which a tightening member can be inserted, and a connecting portion having a partially cylindrical shape and connecting the pair of flange portions in the circumferential direction;
wherein the connecting portion is provided integrally with the shaft, and the clamp is separate from the shaft and is externally fixed on the other end portion in the axial direction of the shaft so as to be able to reduce the diameter of the portion on the other end side in the axial direction of the shaft by reducing a width dimension of the slit, and
wherein the connecting portion comprises a notch recessed in the one side in the axial direction from an end surface on the other side in the axial direction of the flange portion in the portion on the other side in the axial direction of the connecting portion.

10. The torque transmission shaft according to claim 9, wherein the notch is arranged on the other side in the axial direction from a center axis of the installation hole.

11. The torque transmission shaft according to claim 9, wherein the notch has a shape in which a width in the axial direction becomes larger toward away from the flange portion in the circumferential direction of the connecting portion.

12. The torque transmission shaft according to claim 9, wherein the notch has a shape in which a width in the axial direction is constant in the circumferential direction of the connecting portion.

13. The torque transmission shaft according to claim 9, wherein an end portion of the notch in the circumferential direction of the connecting portion is arranged on a side closer to the installation hole than a center axis of the shaft in a direction orthogonal to both a center axis of the installation hole and the center axis of the shaft.

14. The torque transmission shaft according to claim 9, wherein the notch has a symmetrical shape with respect to an imaginary flat plane including a center axis of the shaft and orthogonal to a center axis of the installation hole.

15. The torque transmission shaft according to claim 9, wherein the connecting portion is configured by a yoke portion.

* * * * *